US008823903B2

(12) United States Patent
Momose et al.

(10) Patent No.: US 8,823,903 B2
(45) Date of Patent: Sep. 2, 2014

(54) ILLUMINATING DEVICE, LIQUID CRYSTAL DISPLAY DEVICE, ELECTRONIC DEVICE, AND MANUFACTURING METHOD OF LIGHT GUIDE PANEL

(75) Inventors: Yoichi Momose, Matsumoto (JP); Nobutaka Urano, Chino (JP)

(73) Assignee: Seiko Epson Corporation, Tokyo (JP)

( * ) Notice: Subject to any disclaimer, the term of this patent is extended or adjusted under 35 U.S.C. 154(b) by 140 days.

(21) Appl. No.: 13/548,971

(22) Filed: Jul. 13, 2012

(65) Prior Publication Data
US 2013/0021559 A1    Jan. 24, 2013

(30) Foreign Application Priority Data

Jul. 19, 2011  (JP) ................................. 2011-157591
Nov. 21, 2011  (JP) ................................. 2011-253718
Nov. 21, 2011  (JP) ................................. 2011-253719

(51) Int. Cl.
*G02F 1/1333*    (2006.01)
*G02F 1/1335*    (2006.01)

(52) U.S. Cl.
CPC ............ *G02B 6/0036* (2013.01); *G02B 6/0085* (2013.01); *G02F 1/133603* (2013.01); *G02B 6/0078* (2013.01); *G02F 1/133615* (2013.01); *G02B 6/0065* (2013.01); *G02B 6/0043* (2013.01); *G02B 6/009* (2013.01); *G02B 6/0068* (2013.01)
USPC ............................................. 349/66; 349/69

(58) Field of Classification Search
USPC ................................................ 349/62, 65, 66
See application file for complete search history.

(56) References Cited

U.S. PATENT DOCUMENTS

| 6,467,922 B1 | 10/2002 | Blanc et al. |
| 7,458,712 B2 | 12/2008 | Joo et al. |
| 2008/0013015 A1* | 1/2008 | Joo et al. .......................... 349/65 |

FOREIGN PATENT DOCUMENTS

| JP | A-04-349403 | 12/1992 |
| JP | A-2001-228339 | 8/2001 |
| JP | A-2008-020888 | 1/2008 |

* cited by examiner

*Primary Examiner* — Phu Vu
(74) *Attorney, Agent, or Firm* — Oliff PLC

(57) ABSTRACT

When first grooves are formed by irradiating a lower surface facing a light outgoing surface of a light guide plate for an illuminating device with laser beams, an outer circumferential region is firstly irradiated with the laser beams to form second grooves. Then, the second grooves are inspected. Next, irradiation conditions of the laser beams are adjusted based on an inspection result of the second grooves, irradiation positions of the laser beams are linearly displaced from formation positions of the second grooves, and formation of the first grooves in the scattering reflection region is then started.

21 Claims, 11 Drawing Sheets

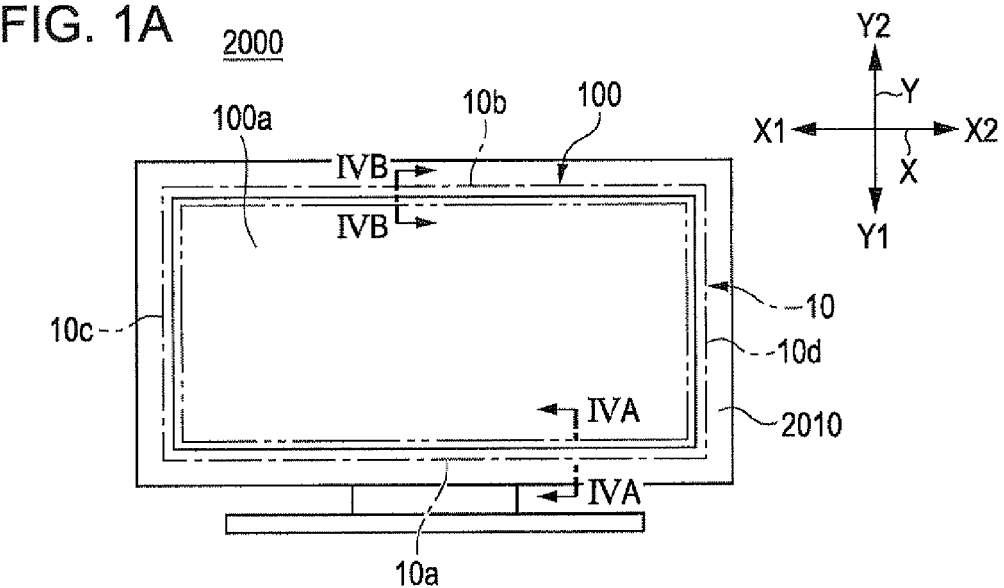
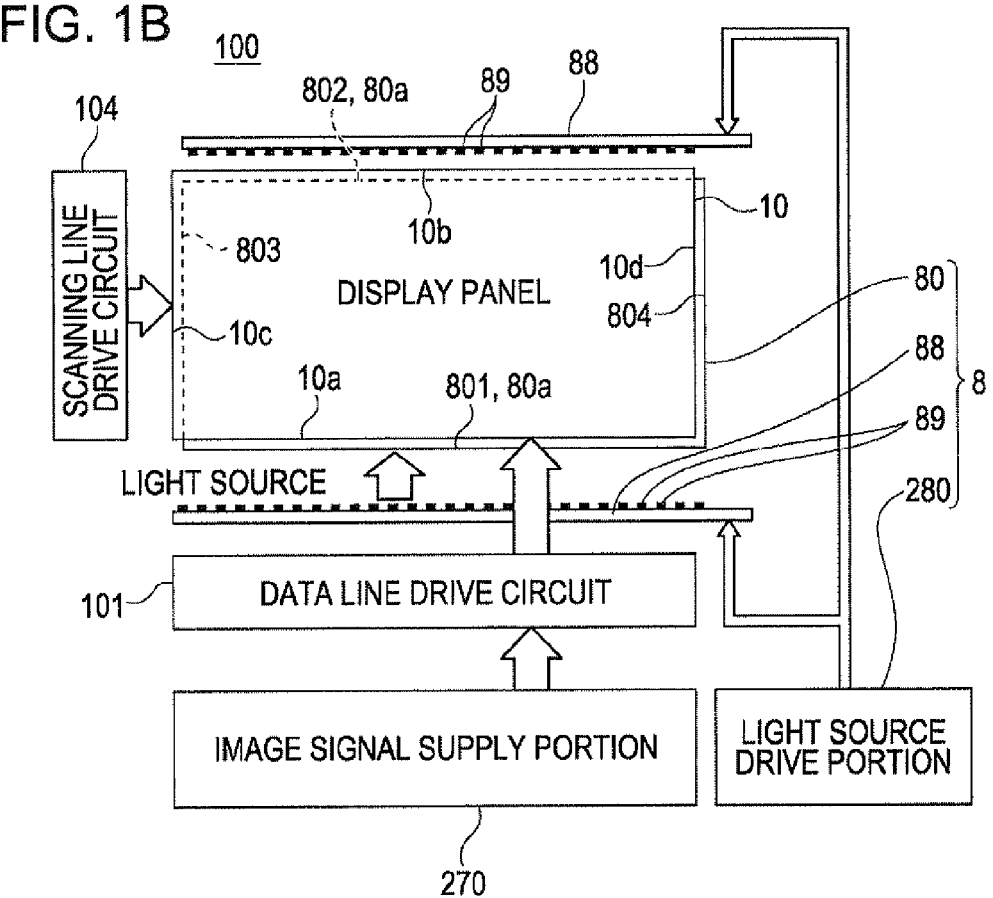

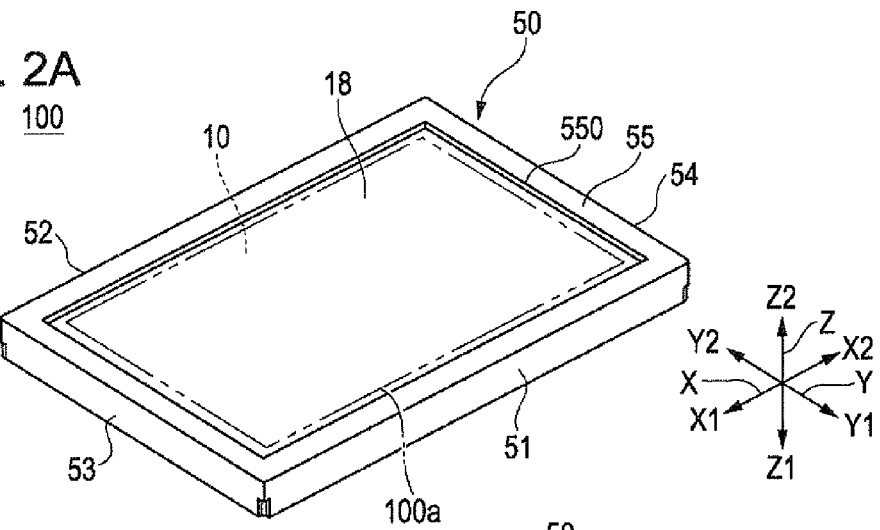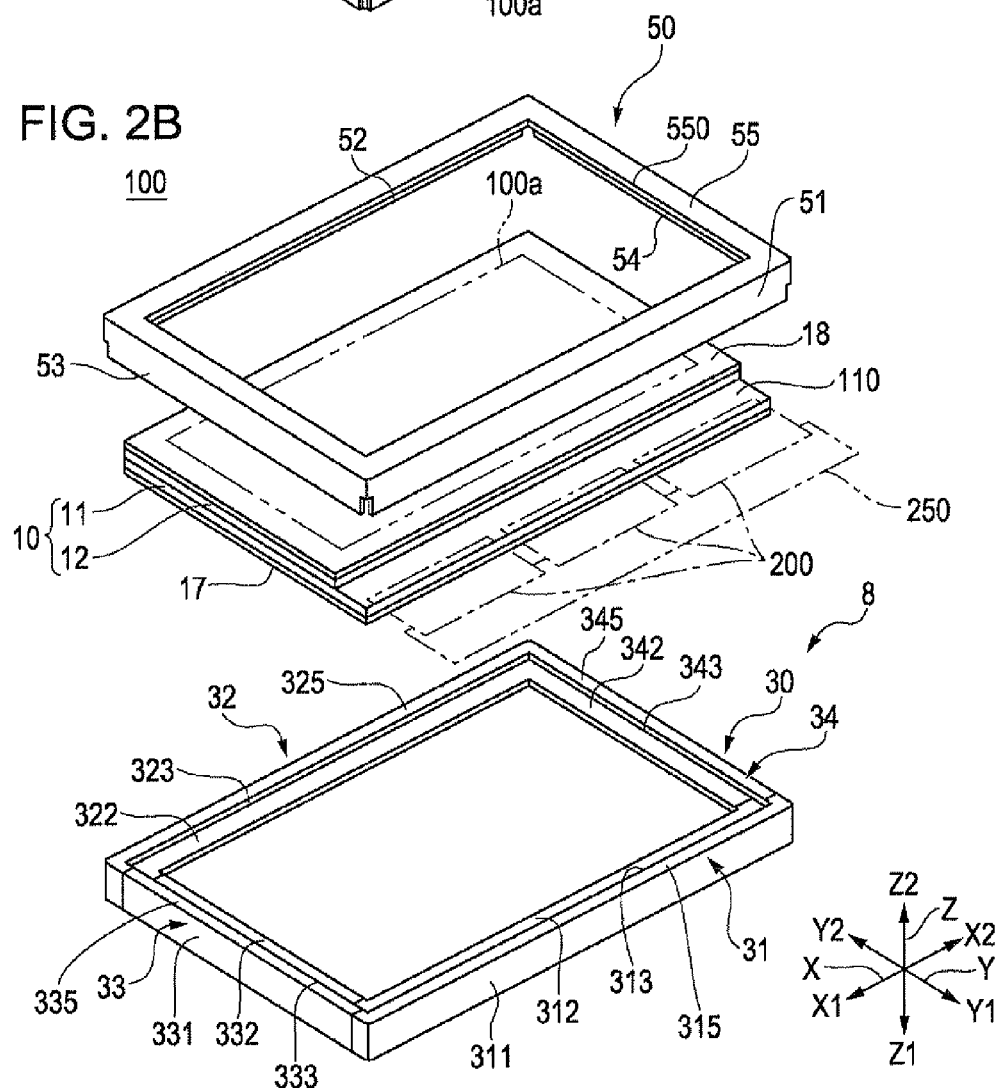

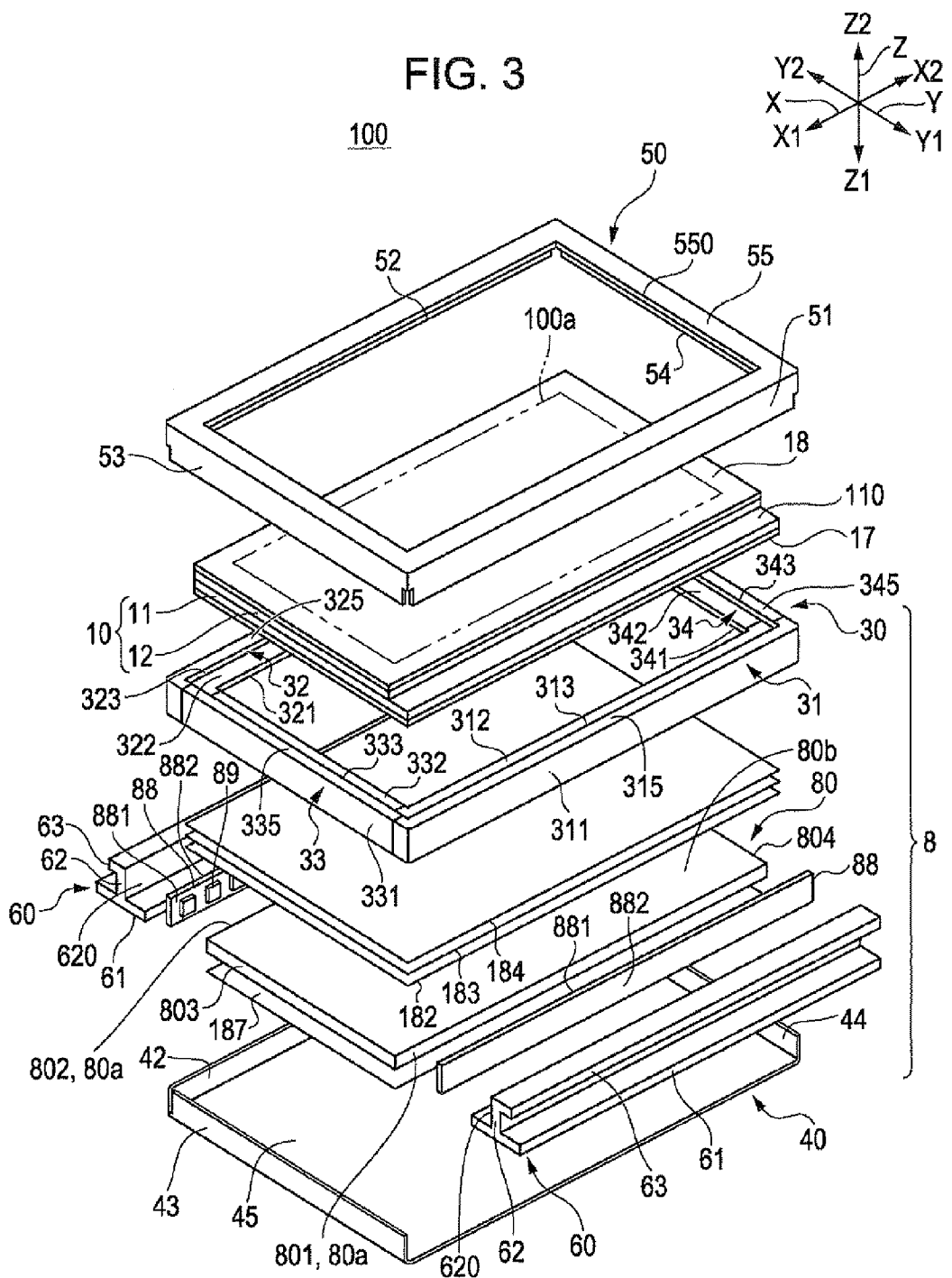

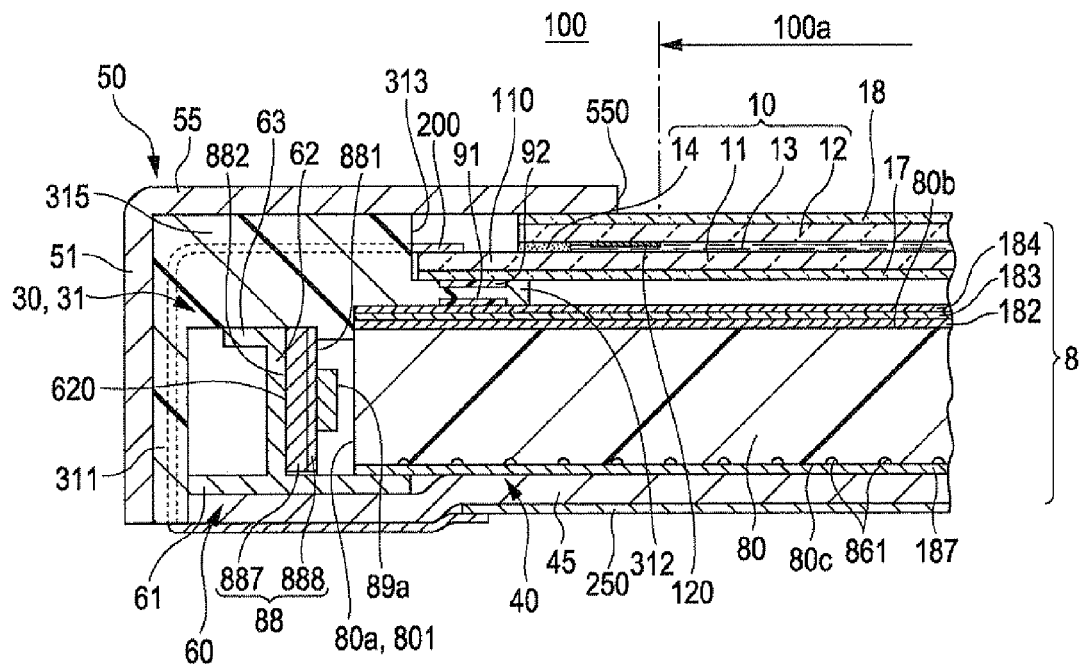
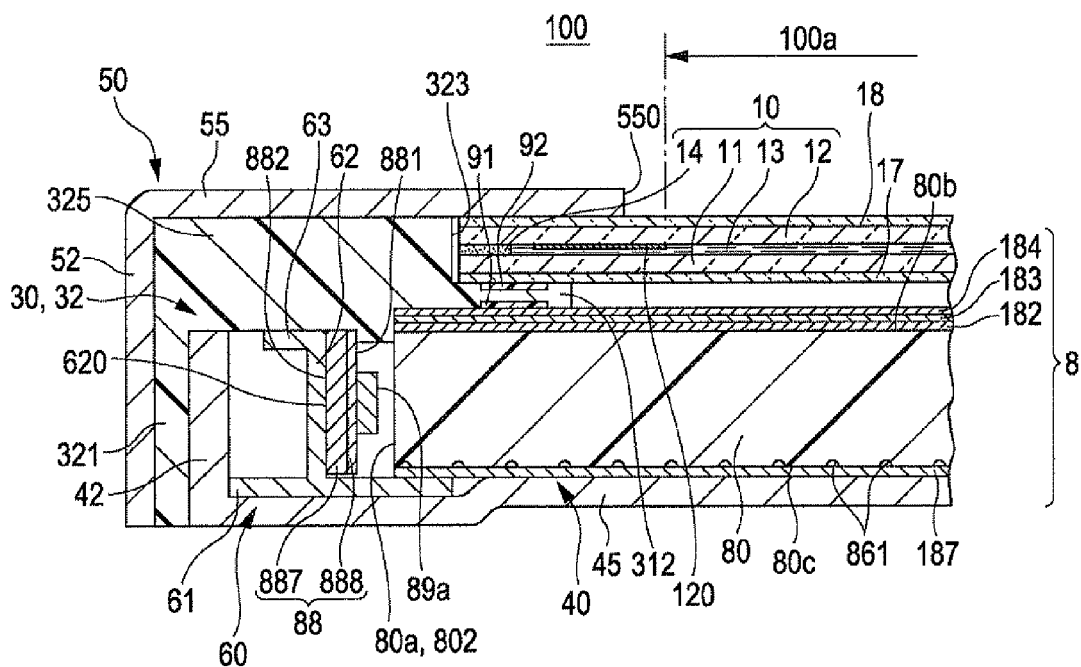

FIG. 9
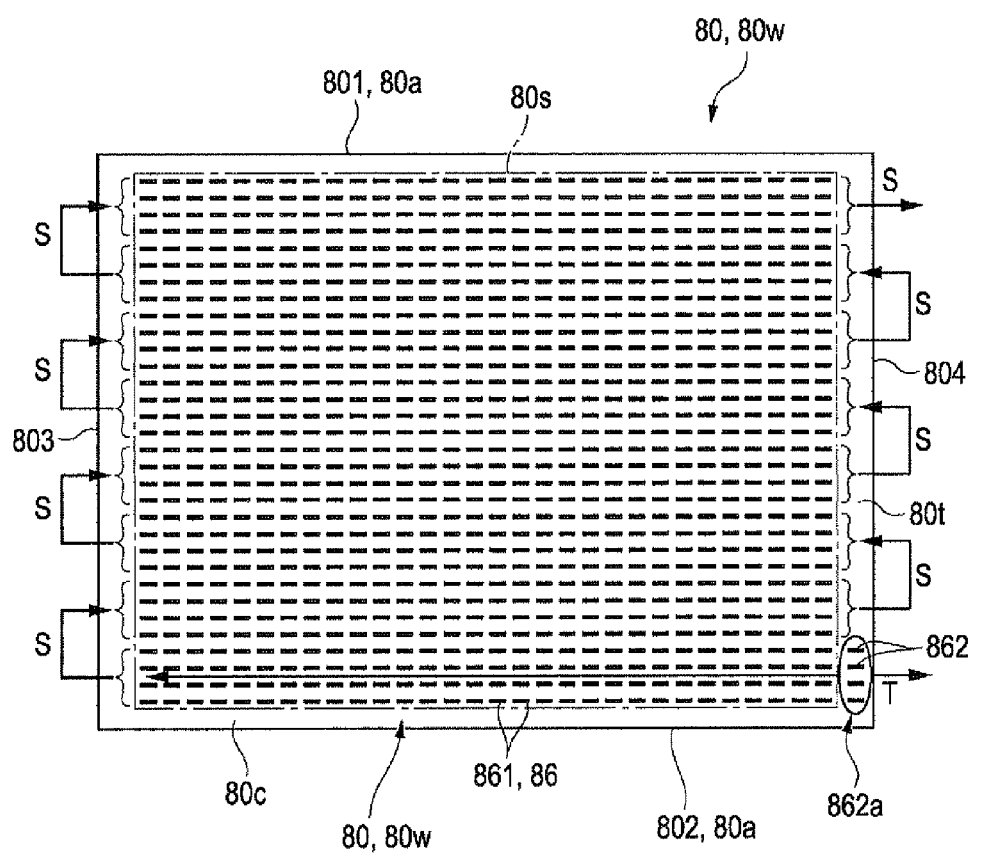
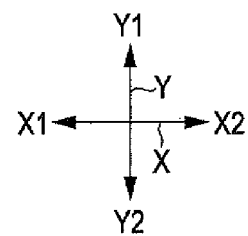

FIG. 11
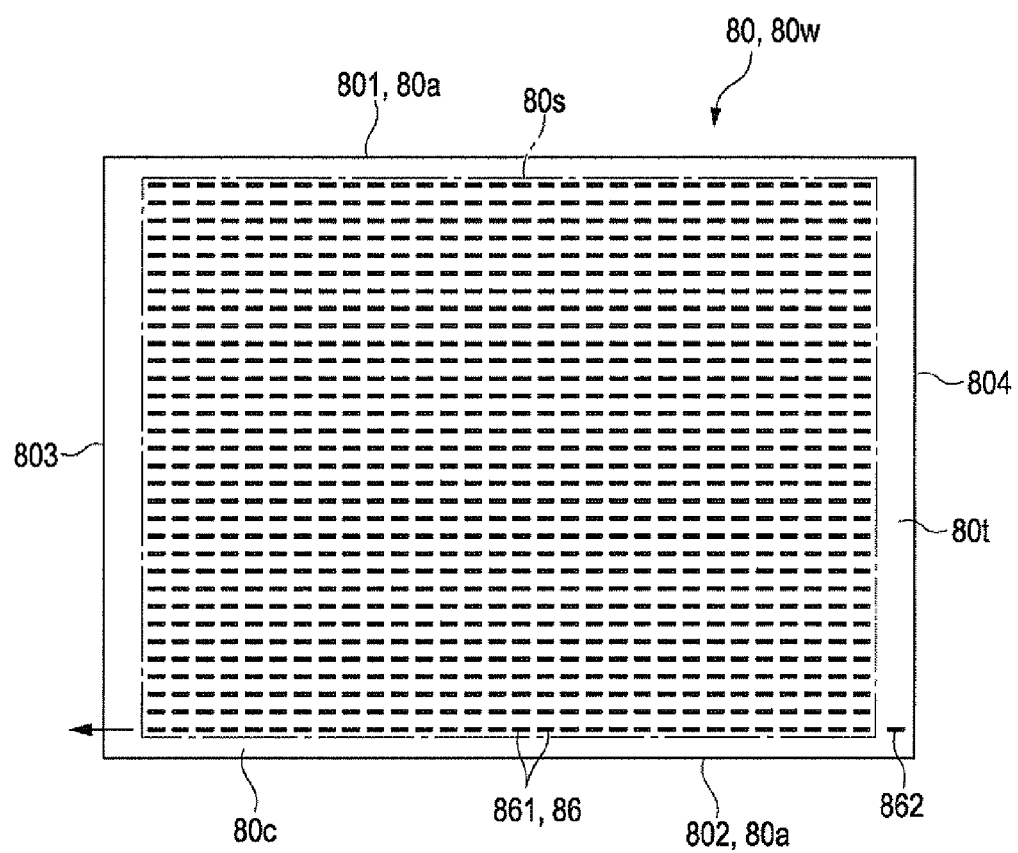
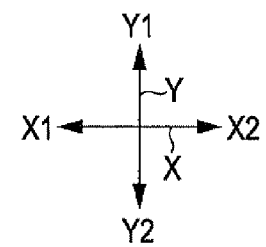

ILLUMINATING DEVICE, LIQUID CRYSTAL DISPLAY DEVICE, ELECTRONIC DEVICE, AND MANUFACTURING METHOD OF LIGHT GUIDE PANEL

BACKGROUND

1. Technical Field

The present invention relates to an illuminating device provided with a light guide plate and a light source, a liquid crystal display device provided with the illuminating device, an electronic device provided with the liquid crystal display device, and a manufacturing method of the light guide plate.

2. Related Art

A liquid crystal display device provided with a transmissive liquid crystal panel includes an illuminating device with a light source whose light emitting surface faces a side end surface as a light incident portion of a light guide plate, wherein a liquid crystal panel is arranged in a superimposed manner on a light outgoing surface side of the light guide plate. In relation to such an illuminating device, a configuration has been proposed in which a groove is formed with a laser beam on a surface opposite to the light incident surface in the light guide plate for the purpose of enhancing illumination light emitting intensity (see JP-A-2008-20888).

When a groove is formed with a laser beam as in JP-A-2008-20888, the light guide plate is displaced while the light guide plate is irradiated with a laser beam in a state where the light guide plate is placed on a stage. On this occasion, if a focus position of the laser beam is not precisely set on the surface of the light guide plate, sizes such as a plane area, and a depth of the groove are changed, and a quality of the light guide plate is varied.

However, the light guide plate is a translucent resin plate formed by molding, and therefore, the thickness is varied for each light guide plate. For this reason, there are problems in that a relationship between the surface of the light guide plate on the stage and a focus position of the laser beam is varied for each light guide plate when the light guide plate is irradiated with the laser beam, and that the quality of the light guide plate is varied.

SUMMARY

An advantage of some aspects of the invention is to provide an illuminating device in which a groove can appropriately be formed in a light guide plate, a liquid crystal display device provided with the illuminating device, an electronic device provided with the liquid crystal display device, and a manufacturing method of the light guide plate.

According to an aspect of the invention, there is provided an illuminating device including: a light guide plate which is provided with a light outgoing surface and side end surfaces; and light sources which are provided with light emitting surfaces facing the side end surfaces as light incident portions among the side end portions of the light guide plate, wherein an opposite surface facing the light outgoing surface of the light guide plate is provided with a scattering reflection region in which a plurality of groove arrays including a plurality of first grooves linearly extending in a first direction are provided in a parallel manner in a second direction among the first and second directions intersecting in in-plane directions of the opposite surface and an outer circumferential region which is interposed between the scattering reflection region and end portions of the light guide plate, and wherein second grooves are provided on one side of extended lines of the groove arrays positioned on one end side in the second direction among the plurality of groove arrays.

According to another aspect of the invention, there is provided a manufacturing method of a light guide plate for an illuminating device, the method including for forming a plurality of groove arrays, which include a plurality of first grooves linearly aligned in a first direction, in a second direction among the first and second directions intersecting in an in-plane direction of an opposite surface by irradiating a scattering reflection region set in the opposite surface facing a light outgoing surface of the light guide plate with the laser beams: forming second grooves by irradiating an outer circumferential region in the opposite surface, which is interposed between the scattering reflection region and end portions of the light guide plate, with laser beams; and starting formation of the first grooves by linearly displacing irradiation positions of the laser beams from formation positions of the second grooves.

According to the invention, when the first grooves are formed by irradiating the opposite surface facing the light outgoing surface of the light guide plate with laser beams, the outer circumferential region interposed between the scattering reflection region and the end portions of the light guide plate is firstly irradiated with the laser beams to form the second grooves, and the second grooves are then inspected. Next, the irradiation conditions of the laser beams are adjusted based on the inspection result of the second grooves, and the formation of the first groove is started by linearly displacing the irradiation positions of the laser beams from the formation positions of the second grooves. For this reason, it is possible to form the first grooves with appropriate dimensions such as plane areas and depths even if the thickness and the like of the translucent resin panel used as the light guide plate vary. Accordingly, it is possible to enhance quality of the light guide plate.

In this case, it is preferable that the first grooves and the second grooves have longitudinal directions in the first direction. That is, it is preferable that both the first grooves and the second grooves have the same basic conditions for formation, such as a condition that the laser beams are displaced in the first direction for formation.

In this case, it is preferable that the plurality of second grooves be formed on extended lines of the groove arrays. With such a configuration, it is possible to perform inspection with the use of the plurality of second grooves formed on each extended line of the groove array. In addition, it is possible to determine optimal manufacturing conditions based on the inspection result of the second grooves if the plurality of second grooves are formed while the manufacturing conditions are changed.

In this case, it is possible to employ a configuration in which the second grooves are provided on each of the extended lines of the plurality of groove arrays positioned on one end side in the second direction among the plurality of groove arrays.

In this case, a configuration may also be employed in which the second groove is provided on an extended line of one groove array positioned on a side which is closest to the one end side in the second direction among the plurality of groove arrays.

In this case, it is preferable that each light incident portion be configured by a side end surface positioned in the second direction in the light guide plate. With such a configuration, no second grooves are provided on the side to which the light from the light source is incident, and therefore, unnecessary scattering reflection in the second groove does not occur.

According to still another aspect of the invention, there is provided a liquid crystal display device including: the illuminating device of the aspect of the invention; and a liquid crystal panel which is arranged so as to be overlapped on a light outgoing surface side of the light guide plate.

The liquid crystal display device according to an aspect of the invention is used in an electronic device such as a liquid crystal television.

BRIEF DESCRIPTION OF THE DRAWINGS

The invention will be described with reference to the accompanying drawings, wherein like numbers reference like elements.

FIGS. 1A and 1B are explanatory diagrams of a liquid crystal television (electronic device) provided with a liquid crystal display device according to a first embodiment of the invention.

FIGS. 2A and 2B are explanatory diagrams showing an overall configuration of the liquid crystal display device according to the first embodiment of the invention.

FIG. 3 is an exploded perspective view of the liquid crystal display device according to the first embodiment of the invention when the liquid crystal display device is divided into smaller parts.

FIGS. 4A and 4B are cross-sectional views of the liquid crystal display device according to the first embodiment of the invention.

FIG. 9 is an explanatory diagram showing a state in which a laser beam is displaced when the light guide plate is manufactured based on a method shown in FIG. 8.

FIG. 11 is an explanatory diagram of a light guide plate used in an illuminating device of a liquid crystal display device according to a third embodiment of the invention.

DESCRIPTION OF EXEMPLARY EMBODIMENTS

Figure 5A:
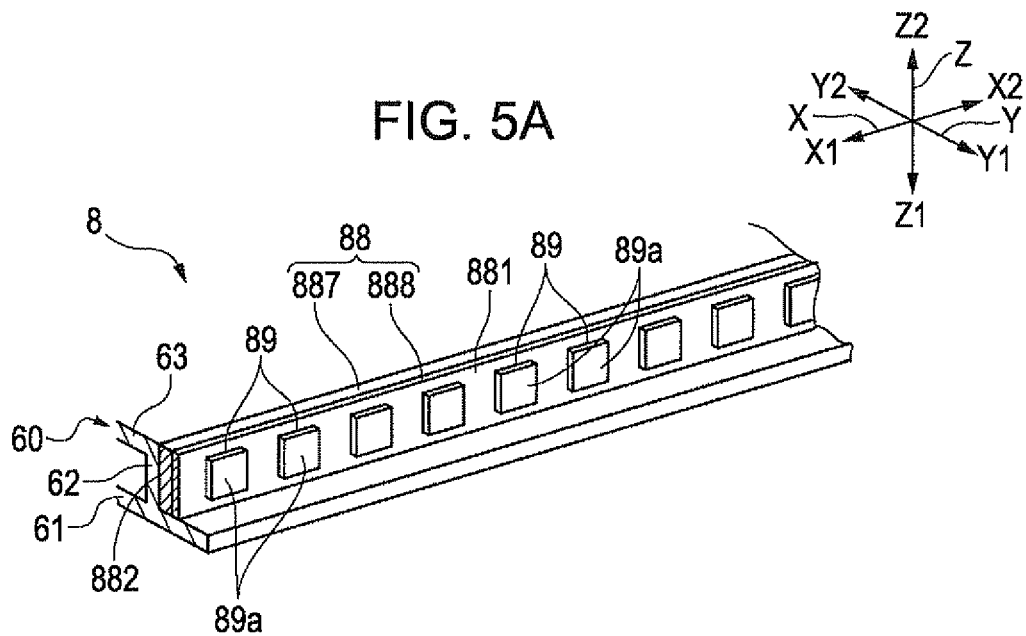
FIGS. 5A and 5B are explanatory diagrams showing a configuration around a light source substrate used in an illuminating device of the liquid crystal display device according to the first embodiment of the invention.

Referring the drawings, description will be given of embodiments according to which the invention is applied to a liquid crystal display device for a liquid crystal television. In addition, each layer and each member are shown with recognizable sizes in the drawings which will be referred to in the following description, and therefore, reduction scales are differently set for each layer and each member. Moreover, directions which intersect with each other in an in-plane direction of a light guide plate and a liquid crystal panel will be referred to as an X axis direction (first direction) and a Y axis direction (second direction), and a direction which intersects with the X axis direction and the Y axis direction will be referred to as a Z axis direction (third direction) in the following description. Furthermore, one side of the X axis direction will be referred to as an X1 side, and the other side thereof will be referred to as an X2 side. One side of the Y axis direction will be referred to as a Y1 side, and the other side thereof will be referred to as a Y2 side. One side of the Z axis direction will be referred to as a Z1 side (lower side), and the other side thereof (aside from which illumination light and display light is emitted) will be referred to as a Z2 side (upper side).

First Embodiment

Overall Configuration

FIGS. 1A and 1B are explanatory diagrams of a liquid crystal television (electronic device) provided with a liquid crystal display device according to a first embodiment of the invention. FIGS. 1A and 1B are an explanatory diagram schematically showing an appearance of a liquid crystal television and a block diagram showing an electric configuration of the liquid crystal display device, respectively.

An electronic device 2000 shown in FIG. 1A is a liquid crystal television which includes a liquid crystal display device 100, a frame 2010 for a television, and the like. The liquid crystal display device 100 includes a liquid crystal panel 10 which will be described later, an image signal supply portion 270 which supplies an image signal to the liquid crystal panel 10, and an illuminating device 8 which supplies illumination light to the liquid crystal panel 10 described below. In addition, the liquid crystal display device 100 includes a scanning line drive circuit 104 which drives a scanning line extending in the axis direction in the liquid crystal panel 10 and a data line drive circuit 101 which drives a data line extending in the Y axis direction in the liquid crystal panel 10. In relation to the scanning line drive circuit 104 and the data line drive circuit 101, a configuration can be employed in which both are incorporated in the liquid crystal panel 10. Moreover, it is also possible to employ a configuration in which one of the scanning line drive circuit 104 and the data line drive circuit 101 is incorporated in the liquid crystal panel 10 while the other is incorporated in an IC for driving which is separately provided from the liquid crystal panel 10 or a configuration in which both the scanning line drive circuit 104 and the data line drive circuit 101 are incorporated in the IC for driving which is separately provided from the liquid crystal panel 10. As such an IC for driving, an IC mounted on a substrate configuring the liquid crystal panel 10 based on a COG mounting technology or an IC mounted on a circuit substrate (see FIGS. 2A and 2B) or the like electrically connected to the liquid crystal panel 10 is used.

According to this embodiment, an illuminating device 8 includes a light guide plate 80 arranged so as to be interposed on the liquid crystal panel 10, a plurality of light emitting elements 89 arranged along side end surfaces, which are set as light incident portions 80a among a plurality of side end surfaces of the light guide plate 80, a light source substrate 88 on which the plurality of light emitting elements 89 are mounted, and a light source drive portion 280 which drives the light emitting elements 89. In this embodiment, the liquid crystal panel 10 has a rectangular shape including four sides 10a, 10b, 10c, and 10d. Among the sides 10a, 10b, 10c, and 10d, the side 10a is a long side positioned on the one side Y1 in the Y axis direction, the side 10b is a long side positioned on the other side Y2 in the Y axis direction, the side 10c is a short side positioned on the one side X1 in the X axis direction, and the side 10d is a short side positioned on the other side X2 in the X axis direction. Corresponding to such a shape, the light guide plate 80 includes four side end surfaces 801, 802, 803, and 804. Among the side end surfaces 801,

802, 803, and 804, the side end surfaces 801 is positioned at a long side of the one side Y1 in the Y axis direction, the side end surface 802 is positioned at a long side of the other side Y2 in the Y axis direction, the side end surface 803 is positioned at a short side on the one side X1 in the X axis direction, and the side end surface 804 is positioned at a short side on the other side X2 in the X axis direction. In this embodiment, the two side end surfaces 801 and 802 facing each other in a short side direction (Y axis direction) among the four side end surfaces 801, 802, 803, and 804 of the light guide plate 80 configure the light incident portions 80*a*. For this reason, the light emitting elements 89 are aligned along the two side end surfaces 801 and 802 (light incident portions 80*a*) of the light guide plate 80, and the substrates 88 for a light source extend along the two side end surfaces 801 and 802 (light incident portions 80*a*) of the light guide plate 80.

Specific Configuration of Liquid Crystal Display Device 100

FIGS. 2A and 2B are explanatory diagrams showing an overall configuration of the liquid crystal display device 100 according to the first embodiment of the invention. FIGS. 2A and 2B are a perspective view and an exploded perspective view of the liquid crystal display device 100, respectively. FIG. 3 is an exploded perspective view of the liquid crystal display device 100 according to the first embodiment of the invention when the liquid crystal display device 100 is divided into further smaller components. FIGS. 4A and 4B are cross-sectional views of the liquid crystal display device 100 according to the first embodiment of the invention, and FIGS. 4A and 4B are a cross-sectional view of the liquid crystal display device 100 taken along a line IVA-IVA in FIG. 1A and a cross-sectional view of the liquid crystal display device 100 taken along a line IVB-IVB in FIG. 1A.

FIGS. 2A, 2B, 3, 4A, and 4B, the liquid crystal display device 100 according to this embodiment is substantially provided with the illuminating device 8 which is a so-called back light apparatus and the transmissive liquid crystal panel 10 arranged so as to be superimposed on an upper surface of the illuminating device 8. In the liquid crystal display device 100, the illuminating device 8 is provided with a first frame 40 (lower metal frame) which is made of metal and arranged on the lower side (the one side Z1 in the Z axis direction) so as to cover a rear surface of the light guide plate 80, a second frame 30 (resin frame) which is made of resin so as to hold an end portion of the liquid crystal panel 10 on the upper side of the first frame 40 and surround and hold the illuminating device 8, and a third frame 50 (upper metal frame) which is made of metal and arranged on the upper side (the other side Z2 in the Z axis direction) of the second frame 30.

The second frame 30 has a rectangular frame shape surrounding a circumference of the liquid crystal panel 10 and includes four frame plates 31, 32, 33, and 34 which are divided corresponding to four sides of the liquid crystal panel 10 in this embodiment. According to this embodiment, a color of the second frame 30 is black, and the second frame 30 functions as a light absorption member to prevent stray light from being generated in the illuminating device 8. The frame plates 31, 32, 33, and 34 are respectively provided with side plate portions 311, 321, 331, and 341 which extend downward on the side of an outer surface of the frame plates 31 to 34, upper plate portions 315, 325, 335, and 345 (end plate portions) which are bent from the upper end edges of the side plate portions 311, 321, 331, and 341 toward the inside, and protruding plate portions 312, 322, 332, and 342 which protrude inward from midway positions in height directions of the upper plate portions 315, 325, 335, and 345. For this reason, step portions 313, 323, 333, and 343 are formed by the protruding plate portions 312, 322, 332, and 342 inside the frame plates 31 to 34, and the liquid crystal panel 10 is held by such step portions 313, 323, 333, and 343 and the protruding plate portions 312, 322, 332, and 342. In addition, the light guide plate 80, the light emitting elements 89, and the like of the illuminating device 8 are arranged on the lower side of the protruding plate portions 312, 322, 332, and 342.

The first frame 40 is formed by press working on a thin metal plate such as an SUS plate. The first frame 40 is provided with a bottom plate portion 45 and three side plate portions 42 to 44 standing from three sides except for the one side Y1 in the Y axis direction and has a rectangular box shape with an opened upper surface. The side plate portions 321, 331, and 341 of the second frame 30 are superimposed on the outside of the side plate portions 42 to 44 of the first frame 40. In addition, the side plate portion 311 of the second frame 30 covers the one side Y1 in the Y axis direction of the first frame 40.

The third frame 50 is also formed by press working or the like on a thin metal plate such as an SUS plate in the same manner as in the first frame 40. The third frame 50 is provided with a rectangular upper plate portion 55 (end plate portion) and four side plate portions 51 to 54 bent downward from the outer circumferential edge of the upper plate portion 55 and has a rectangular box shape with an opened lower surface. The side plate portions 51 to 54 are superimposed on the outside of the side plate portions 311, 321, 331, and 341 of the second frame 30. The upper plate portion 55 is formed with a rectangular window 550 from which light emitted from the liquid crystal panel 10 is emitted, and the upper plate portion 55 covers entire circumference of the outer circumferential end portion on the display light emitting side of the liquid crystal panel 10. In addition, the upper plate portion 55 of the third frame 50 is provided so as to completely cover the upper sides of the upper plate portions 315, 325, 335, and 345 (end plate portions) of the second frame 30.

The third frame 50, the second frame 30, and the first frame 40 which are configured as described above are coupled to each other with bolts (not shown) or the like to hold the liquid crystal panel 10 and the illuminating device 8 inside. Here, flexible sheets 91 and 92 are adhered to the lower surfaces and the upper surfaces of the protruding plate portions 312, 322, 332, and 342 of the second frame 30 as shown in FIGS. 4A and 4B. For this reason, the liquid crystal panel 10 is supported by the protruding plate portions 312, 322, 332, and 342 via the flexible sheet 92 when the liquid crystal display device 100 is assembled. In addition, generation of floating and positional deviation of optical sheets (a diffusion sheet 182, prism sheets 183 and 184, and the like) in the illuminating device 8 is suppressed via the flexible sheet 91 when the liquid crystal display device 100 is assembled.

Configuration of Liquid Crystal Panel 10

As shown in FIGS. 2A, 2B, 3, 4A, and 4B, the liquid crystal panel 10 has a rectangular planar shape and is provided with an element substrate 11 on which pixel electrodes (not shown) are formed, a facing substrate 12 which are arranged so as to face the element substrate 11 with a predetermined interval, and a rectangular frame-shaped sealing member 14 which adheres the facing substrate 12 to the element substrate 11. In such a liquid crystal panel 10, a liquid crystal layer 13 is held in a region surrounded by the sealing member 14. The element substrate 11 and the facing substrate 12 are made of translucent substrates such as glass substrates. On the element substrate 11, a plurality of scanning lines (not shown) extend in the X axis direction, a plurality of data lines (not shown) extend in the Y axis direction, and switching elements (not shown) and pixel electrodes (not shown) are provided corresponding to intersections between the scanning lines and the data lines.

In this embodiment, the facing substrate 12 is arranged on the display light emitting side, and the element substrate 11 is arranged on the side of the illuminating device 8. In addition, a surface of the facing substrate 12, which faces the element substrate 11, is formed with a frame edge layer 120 made of a rectangular light blocking layer along an inner edges of the four sides of the sealing member 14, and a region defined by the inner edge of the frame edge layer 120 corresponds to an image display region 100a. Moreover, the inner edge of the upper plate portion 55 of the third frame 50 is at a midway position in the width direction of the frame edge layer 120, and the window 550 of the third frame 50 is superimposed on the image display region 100a and the inner circumferential part of the frame edge layer 120.

The liquid crystal panel 10 is configured as a liquid crystal panel based on a TN (Twisted Nematic) scheme, an ECB (Electrically Controlled Birefringence) scheme, or a VAN (Vertical Aligned Nematic) scheme, pixel electrodes are formed on the element substrate 11, and a common electrode (not shown) is formed on the facing substrate 12. In addition, when the liquid crystal panel 10 is a liquid crystal panel based on an IPS (In Plane Switching) scheme or an FFS (Fringe Field Switching) scheme, the common electrode is provided on the side of the element substrate 11. In addition, the element substrate 11 is arranged on the display light emitting side with respect to the facing substrate 12 in some cases. An upper polarization plate 18 is arranged in a superimposed manner on the upper surface of the liquid crystal panel 10, and a lower polarization plate 17 is arranged between the lower surface of the liquid crystal panel 10 and the illuminating device 8.

In this embodiment, the element substrate 11 is larger than the facing substrate 12. Therefore, the element substrate 11 includes a flange portion 110 extending from the end portion of the facing substrate 12, and a plurality of flexible wiring substrates 200 are connected to the upper surface of such flange portion 110. The flexible wiring substrates 200 are connected to a circuit substrate 250, and the IC for control (not shown) configuring the image signal supply portion 270 described above with reference to FIGS. 1A and 1B and an IC for driving the light source (not shown) configuring the light source drive portion 280 are mounted on the flexible wiring substrates 200 or the circuit substrate 250.

Configuration of Illuminating Device 8

Figure 5B:
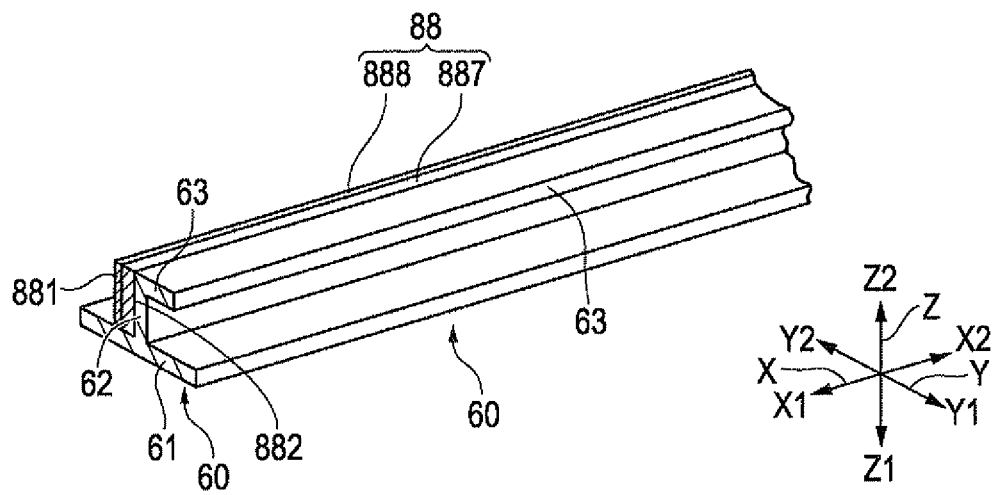

FIGS. 5A and 5B are explanatory diagrams showing a configuration around the light source substrate 88 used in the illuminating device 8 of the liquid crystal display device 100 according to the first embodiment of the invention, and FIGS. 5A and 5B are an explanatory diagram schematically showing a state on the side of one surface 881 of light source substrate 88 and an explanatory diagram schematically showing a state on the side of the other surface 882 of the light source substrate 88, respectively. In addition, the configurations of the light emitting elements 89 and the light source substrates 88 arranged on the two side end surfaces 801 and 802 (light incident portion 80a) of the light guide plate 80, which face each other in the Y axis direction, are the same. Accordingly, FIG. 5A shows the light emitting elements 89 and the light source substrate 88 arranged on the side end surface 802 of the light guide plate 80, and FIG. 5B shows the light source substrate 88 and the like on the side end surface 801 of the light guide plate 80.

As shown in FIGS. 3, 4A, and 4B, the illuminating device 8 is provided with the light guide plate 80 arranged so as to be interposed on the lower surface side of the liquid crystal panel 10 and the plurality of light emitting elements 89 aligned from one end side (the one end side X1 in the X axis direction) of the light incident portions 80a toward the other end side (the other side X2 in the X axis direction) while the light emitting surfaces 89a are made to face the light incident portions 80a of the light guide plate 80. In this embodiment, the plurality of light emitting elements 89 are mounted on the one surface 881 of the light source substrate 88 extending in the X axis direction along the light incident portions 80a. The light emitting elements 89 are LEDs (Light Emitting Diodes) emitting white light and emit light from the light source as diverging light.

In the illuminating device 8 according to this embodiment, the two side end surfaces 801 and 802 facing each other in the Y axis direction from among the side end surfaces 801, 802, 803, and 804 of the light guide plate 80 are used as the light incident portion 80a. For this reason, the light emitting surface 89a are made to face the two light incident portions 80a (side end surfaces 801 and 802) of the light guide plate 80, and the plurality of light emitting element 89 are aligned from the one end side to the other end sire of each of the two light incident portions 80a (side end surfaces 801 and 802). In addition, two light source substrates 88 extend along the two light incident portions 80a (side end surfaces 801 and 802), and the plurality of light emitting elements 89 are mounted on the one surface 881 of each of the two the light source substrates 88.

According to this embodiment, the light guide plate 80 is a translucent resin plate made of acrylic resin, polymethylstyrene resin, polycarbonate resin, or the like, and a reflective sheet 187 is disposed in a superimposed manner between a lower surface 80c of the light guide plate 80 (a surface which is opposite to a light outgoing surface 80b/an opposite surface) of the light guide plate 80 and a bottom plate portion 45 of the first frame 40. The resin plate used as the light guide plate 80 is formed by extrusion molding, injection molding, or the like.

In addition, the optical sheets such as the diffusion sheet 182, the prism sheets 183 and 184 are arranged in a superimposed manner between the upper surface (light outgoing surface 80b) of the light guide plate 80 and the liquid crystal panel 10. The diffusion sheet 182 is a sheet provided with a coating layer in which silica particles or the like are dispersed in translucent resin such as acrylic resin or polycarbonate resin. According to this embodiment, the two prism sheets 183 and 184 are arranged such that both ridges perpendicularly intersect with each other. For this reason, the illumination light emitted from the light outgoing surface 80b of the light guide plate 80 is diffused in all directions by the diffusion sheet 182, and a directional property that a peak is present in the front direction of the liquid crystal panel 10 is then given by the two prism sheets 183 and 184.

As will be described later with reference to FIGS. 6A, 6B, and the like, a plurality of first grooves 861 configured by fine concave portions which linearly extend in the X axis direction (an alignment direction of the light emitting elements, which corresponds to a long side direction of the light guide plate and the liquid crystal panel) are formed in the lower surface 80c where the reflective sheet 187 is positioned, in the light guide plate 80. According to this embodiment, a density of the first grooves 861 in the X axis direction (a direction in which the first grooves 861 linearly extend) is gradually increased in a direction away from the light emitting elements 89. Therefore, the intensity distribution of the illumination light emitted from the light guide plate 80 is uniformized regardless of a distance from the light emitting elements 89.

In the bottom plate portion 45 of the first frame 40, steps are partially formed so as to secure a gap between the lower surface 80c of the light guide plate 80 and the first frame 40 in a region in a light guide plate 80, which is overlapped with the side where the side end surfaces 801 and 802 as the light incident portions 80a are positioned, and the bottom plate portion 45 is bent toward the light guide plate 80. In so doing, it is possible to pinch the reflective sheet 187 and the lower plate portion 61 of the light source supporting member 60 in a gap between the lower surface 80c of the light guide plate 80 and the bottom plate portion 45. In addition, since a concave portion is formed on the rear surface side of the first frame 40 by partially bending the bottom plate portion 45 of the first frame 40 toward the light guide plate 80, the flexible wiring substrate 200 is bent and made to extend up to the lower surface (rear surface) of the bottom plate portion 45 of the first frame 40, and the circuit substrate 250 is arranged so as to be accommodated in such a concave portion. For this reason, it is possible to decrease the thickness of the illuminating device 8.

According to this embodiment, the light source substrate 88 is arranged such that one surface 881 with the light emitting elements 89 mounted thereon faces the light incident portions 80a of the light guide plate 80. In addition, the light source substrate 88 has a configuration in which a wiring pattern and a land are provided along with an insulating layer on the side of the one surface 881 of the plate-shaped metal plate 887 extending along the light incident portions 80a. Such configuration can be realized by attaching the flexible wiring substrate 888 obtained by integrating a resin base material layer, a wiring pattern, an insulation protecting layer, and the like in this order to the side of the one surface 881 of the metal plate 887, for example. Accordingly, an insulation property is electrically secured between the metal plate 887 and the land on which the wiring pattern and the chips of the light emitting elements 89 are mounted. According to this embodiment, the metal plate 887 is made of an aluminum plate, and the metal plate 887 secures mechanical strength of the light source substrate 88 and also functions as a heatsink for the heat generated by the light emitting elements 89.

As shown in FIGS. 3, 4A, 4B, 5A, and 5B, to light source supporting members 60 for holding the light source substrate 88 are respectively provided on the sides of the other surfaces 882 of the two light source substrate 88, and two light source supporting members 60 are held by the first frame 40 and the second frame 30. According to this embodiment, the light source supporting members 60 are metal components with rod shapes extending along the other surfaces 882 of the light source substrates 88, each of which has a lower plate portion 61 overlapped with the bottom plate portion 45 of the first frame 40 and a substrate supporting plate portion 62 protruding upward from a midway position in the width direction of the lower plate portion 61. In addition, each of the light source supporting member 60 is provided with an upper plate portion 63 bent from the substrate supporting plate portion 62 to the side opposite to the side where the light guide plate 80 is positioned, and the upper plate portion 63 is fixed to the second frame 30 and the like by a screw or the like.

In the light source supporting member 60 with such a configuration, the surface of each substrate supporting plate portion 62, in which the light guide plate 80 is positioned, is a substrate holding surface 620 for holding the light source substrate 88, and the light source substrate 88 is fixed to the substrate holding surface 620 by a screw or the like. In such a state, the other surface 882 (metal plate 887) of each light source substrate 88 is overlapped with the substrate holding surface 620 of the light source supporting member 60 in a plate contact state. In addition, the light source supporting member 60 is made of metal such as aluminum or iron-based metal. For this reason, the heat generated by the light emitting elements 89 is delivered from the metal plate 887 of the light source substrate 88 to the light source supporting member 60, and the heat of the light source supporting member 60 is delivered to the first frame 40. Therefore, it is possible to suppress temperature rising of the light emitting elements 89.

Configuration of Light Guide Plate 80

Figure 6A:
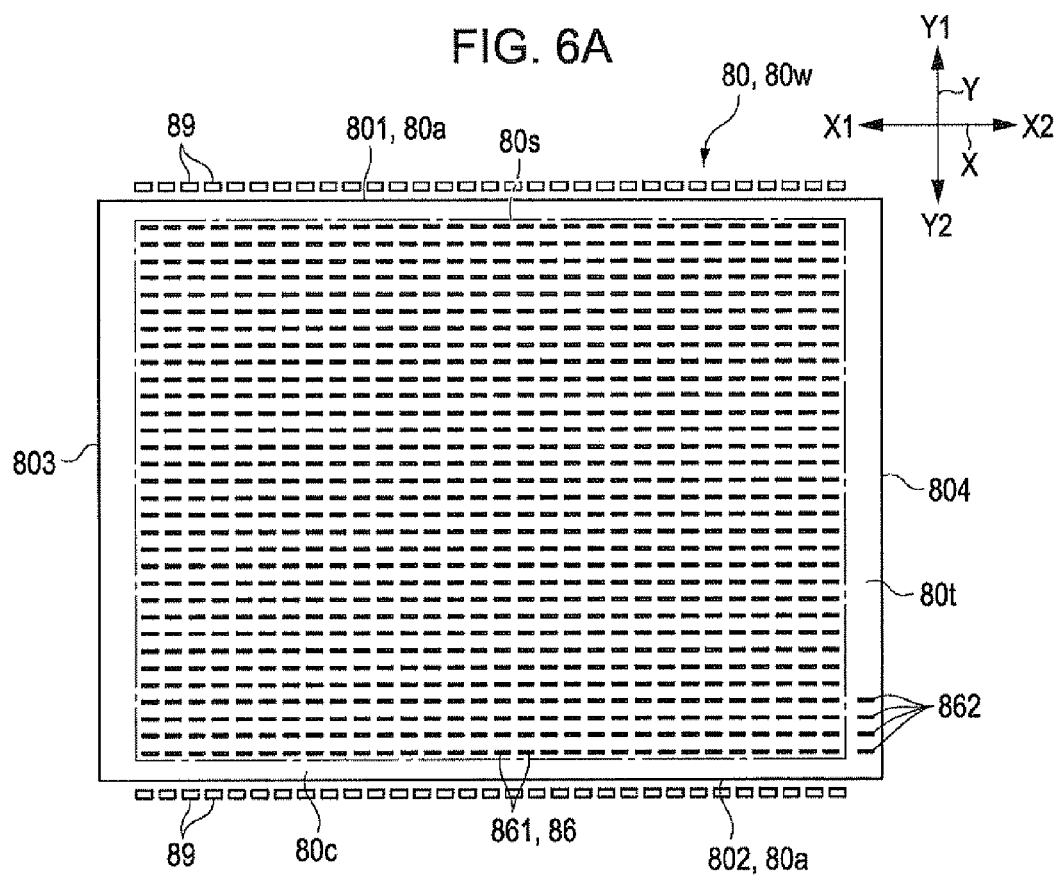
FIGS. 6A and 6B are explanatory diagrams of a light guide plate used in the illuminating device of the liquid crystal display device according to the first embodiment of the invention.
Figure 6B:
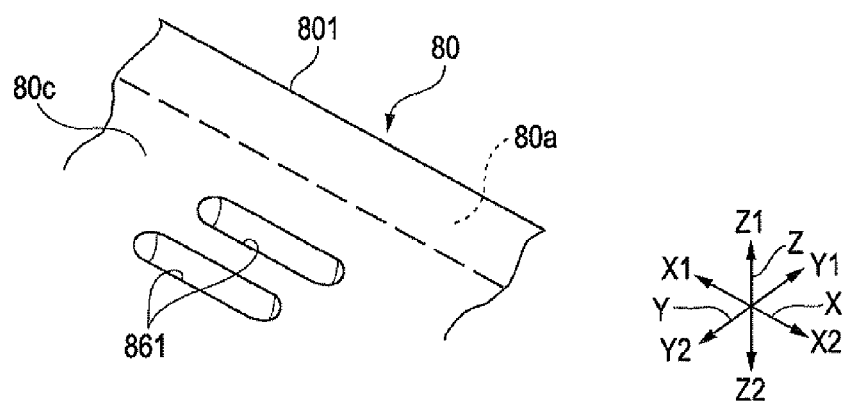
Figure 7A:
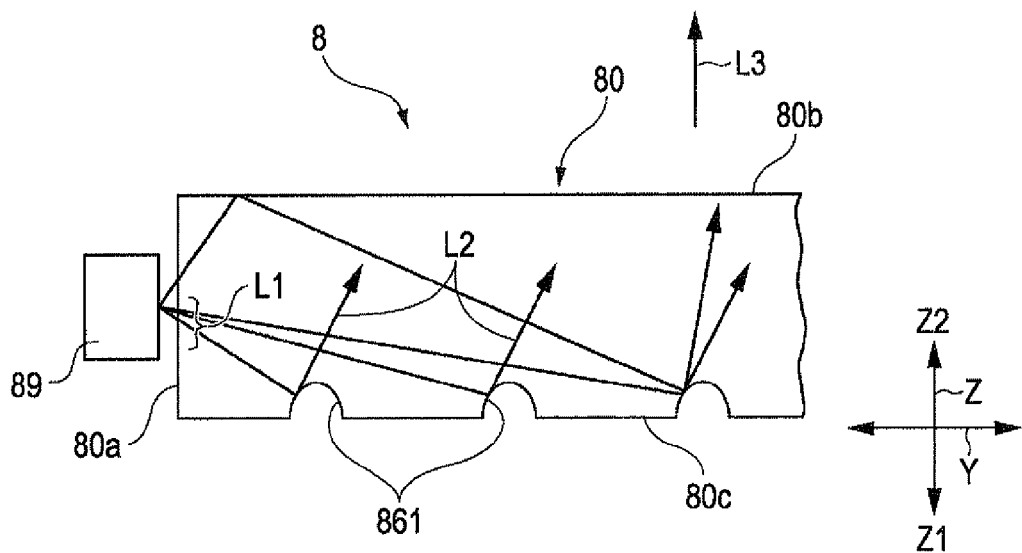
FIGS. 7A and 7B are explanatory diagrams of a first groove shown in FIGS. 6A and 6B.
Figure 7B:
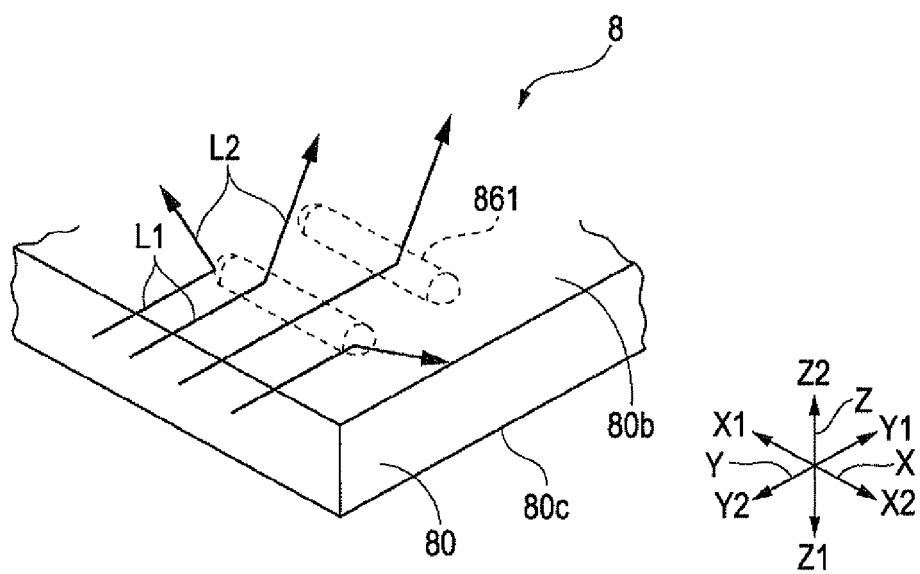

FIGS. 6A and 6B are explanatory diagrams of the light guide plate 80 used in the illuminating device 8 of the liquid crystal display device 100 according to the first embodiment of the invention, where FIG. 6A is bottom view of the light guide plate 80 when viewed from the side of the lower surface 80c and FIG. 6B is a perspective view of the first groove when viewed from the lower surface 80c. FIGS. 7A and 7B are explanatory diagrams of the first grooves 861 shown in FIGS. 6A and 6B, where FIG. 7A is an explanatory diagram showing a state in which light is reflected by the first grooves 861 and FIG. 7B is an explanatory diagram showing a direction in which the light is reflected by the first grooves 861.

As shown in FIGS. 6A and 6B, a scattering reflection region 80s where the plurality of first grooves 861 are formed is set at the center of the lower surface 80c of the light guide plate 80, and a gap between the scattering reflection region 80s and the end portion of the light guide plate 80 corresponds to an external circumferential region 80t where no first groove 861 is formed. The scattering reflection region 80s is a region from which the illumination light is emitted, which is overlapped with the image display region 100a of the liquid crystal panel 10.

In the scattering reflection region 80s, a plurality of first grooves 861 are provided such that a plurality of groove arrays 86 linearly aligned in the X-axis direction is aligned in a parallel manner in the Y axis direction. According to this embodiment, the first grooves 861 are aligned at equal intervals in each groove array 86. Accordingly, the plurality of first grooves 861 linearly extending in the X axis direction are arranged so as to intersect with the emitting direction of the light emitted from the light emitting elements 89.

According to this embodiment, second grooves 862 which are formed based on the same manufacturing and working methods as those of the first grooves 861 are provided in the outer circumferential region 80t on the lower surface 80c of the light guide plate 80. The second grooves 862 are provided on one side (the other side X2 in the X axis direction) on extended lines of the groove arrays 86 positioned on the one end side (the end portion on the other side Y2 in the Y axis direction) in the Y axis direction, among the plurality of groove arrays 86. For this reason, the second grooves 862 are formed in a part interposed between the side end surface 804 which is not used as the light incident portion 80a in the light guide plate 80 and the scattering reflection region 80s, in the outer circumferential region 80t, and the positions are in a region near corners of the light guide plate 80 and the scattering reflection region 80s.

In addition, each of the second grooves 862 is provided on one side (the other side X2 in the X axis direction) of each of the extended lines of the plurality of groove arrays 86 positioned on the one end side (the end portion on the other side Y2 in the Y axis direction) in the Y axis direction among the plurality of groove arrays 86. More specifically, the second grooves 862 are provided one by one on one side (the other side X2 in the X axis direction) on the extended lines of four groove arrays 86 positioned on the one end side (the end portion on the other side Y2 in the Y axis direction) in the Y axis direction among the plurality of groove array 86, and the number of the second grooves 862 is four in total.

As shown in FIGS. 6A, 6B, 7A, and 7B, each of the first grooves 861 is constituted by a concave portion concaved in the lower surface 80c of the light guide plate 80, which has a groove shape with a longitudinal direction in the X axis direction. A YZ cross-sectional surface of each first groove 861 has a substantially prism shape, and the bottom portion thereof has a semicircular shape with a radius at a curvature of about 30 μm to 80 μm. An opening width of each first groove 861 ranges from about 100 μm to 300 μm, for example, and an inclination angle of each side surface ranges from 30° to 55°. The second grooves 862 are for testing before the formation of the first grooves 861 and have the same configurations as those of the first grooves 861.

According to the illuminating device 8 with such a configuration, the light emitted from the light emitting elements 89 is incident from the light incident portions 80a as shown by arrows L1 and then advances through the inside of the light guide plate 80 while total reflection is repeated at the light outgoing surface 80b and the lower surface 80c inside the light guide plate 80. Then, the light is reflected by the first grooves 861 as shown by arrows L2, and thereby the light is emitted as the illumination light from the light outgoing surface 80b as shown by an arrow L3. On this occasion, the light reflected by the end portions of the first grooves 861 advances while diffused and propagated in various directions, and thereby it is possible to enhance the uniformity of the illumination light emitted from the light outgoing surface 80b of the light guide plate 80.

Manufacturing Method of Light Guide Plate 80

Figure 8:
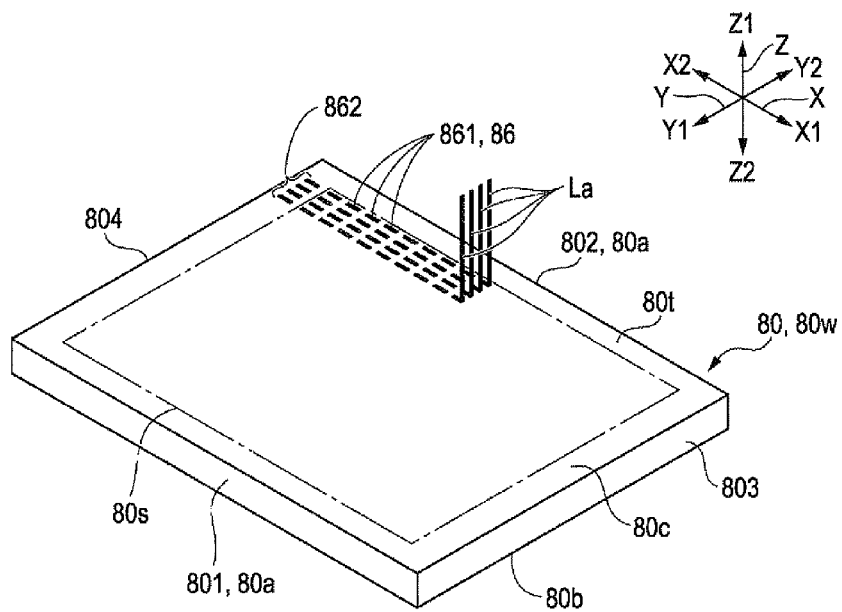
FIG. 8 is an explanatory diagram showing a manufacturing method of the light guide plate shown in FIGS. 6A and 6B.

FIG. 8 is an explanatory diagram showing a manufacturing method of the light guide plate 80 shown in FIGS. 6A and 6B. FIG. 9 is an explanatory diagram showing a state where laser beams are displaced for manufacturing the light guide plate 80 based on the method shown in FIG. 8.

For manufacturing the light guide plate 80 as described above with reference to FIGS. 6A, 6B, 7A, and 7B, a resin plate 80w for the light guide plate is formed by extrusion molding or injection molding and then placed on an XY stage (not shown) such that one surface (the lower surface 80c of the light guide plate 80) of the resin plate 80w faces upward, as shown in FIG. 8. Then, the resin plate 80w is irradiated with laser beams La such as carbon dioxide lasers or femtosecond lasers, and a polymer material constituting the resin plate 80w is melted and volatilized at the irradiation positions thereby forming the first grooves 861. According to this embodiment, four laser beams La are generated by the laser light emitted from a laser apparatus. That is, four laser beams are emitted from one head (omitted in the drawings).

According to this embodiment, while the four laser beams La are turned ON and OFF at predetermined timing, the resin plate 80w is displaced in the X axis direction, and the irradiation positions of the laser beams La are displaced in the X axis direction, as shown by arrows S in FIG. 9, thereby simultaneously forming four groove arrays 86. In addition, after the formation of the four groove arrays 86, the resin plate 80w is displaced in the Y axis direction to newly form four groove arrays 86 at positions deviated in the one side Y1 in the Y axis direction by an amount corresponding to four arrays with respect to the four groove arrays 86 previously formed. Such processes are repeated to form the first grooves 861 over the entirety of the scattering reflection region 80s.

When the light guide plate 80 is manufactured based on the above method, the light guide plate 80 may be degraded if sizes such as a plane area and a depth of each first groove 861 vary. Thus, a region surrounded by a circle 862a in FIG. 9 in the outer circumferential region 80t is irradiated with the laser beams La before the formation of the first grooves 861 to perform a second groove formation process for forming the second grooves 862, according to this embodiment.

In the second groove formation process, the resin plate 80w is displaced in the X axis direction such that the positions at which the resin plate 80w is irradiated with the laser beams La are displaced from positions near the scattering reflection region 80s toward the end portion of the resin plate 80w as shown by an arrow T in FIG. 9, for example. For forming the second grooves 862, the resin plate 80w may be displaced in the X axis direction such that the positions at which the resin plate 80w is irradiated with the laser beams La are displaced from the side of the end portion of the resin plate 80w toward the position near the scattering reflection region 80s, in a direction opposite to the direction shown by the arrow T.

Next, an inspection process is performed for inspecting sizes (a length, a width, and a depth of each second groove 862), a shape, and the like of each second groove 862.

Next, a first groove formation process is performed for forming the first grooves 861. In such a first groove formation process, irradiation conditions of the laser beams La is adjusted based on the inspection result in the inspection process, and the irradiation positions of the laser beams La are linearly displaced from the formation positions of the second grooves 862 to start the formation of the first grooves 861. The irradiation conditions of the laser beams La include a focusing position of the laser beams La, timing of turning ON and OFF the power, and the like. In addition, a displacement speed of the resin plate 80w in the X axis direction for forming the first groove 861 is preferably the same as a displacement speed of the resin plate 80w in the X axis direction for forming the second grooves 862.

Although the above description was given of a case in which the resin plate 80w (the light guide plate 80) is displaced with respect to the head emitting the laser beams La to form the grooves (the first grooves 861 and the second grooves 862), the head emitting the laser beams La may be displaced. In addition, both the head emitting the laser beams La and the resin plate 80w (light guide plate 80) may be displaced.

Main Effects of the Embodiments

As described above, when the lower surface 80c (opposite surface) facing the light outgoing surface 80b of the light guide plate 80 is irradiated with the laser beams La to form the first grooves 861, the outer circumferential region 80t is firstly irradiated with the laser beams La to form the second grooves 862, and the second grooves 862 are then inspected, according to the embodiment. Next, the irradiation conditions of the laser beams La is adjusted based on the inspection result of the second grooves 862, the irradiation positions of the laser beams La are linearly displaced from the formation positions of the second grooves 862, and the formation of the first grooves 861 is started. Therefore, it is possible to form the first grooves 861 with appropriate dimensions such as plane areas and depths even if the thickness and the like of the resin plate 80w used in the light guide plate 80 vary. For this reason, it is possible to enhance the quality of the light guide plate 80.

In addition, according to this embodiment, both the first grooves 861 and the second grooves 862 have longitudinal directions in the X axis direction. That is, the first grooves 861 and the second grooves 862 have the same basic conditions for formation such as a condition that the laser beams La are displaced in the X axis direction for forming both. For this reason, it is possible to appropriately form the first grooves 861 if the irradiation conditions of the laser beams La are adjusted based on the inspection result of the second grooves 862.

In addition, the light incident portions 80a are configured by the side end surfaces 801 and 802 positioned in the Y axis direction in the light guide plate 80, and no second groove 862 is provided on the side where the light is incident from the light emitting elements 89. Therefore, no unnecessary scattering reflection in the second grooves 862 occurs.

Second Embodiment

Figure 10:
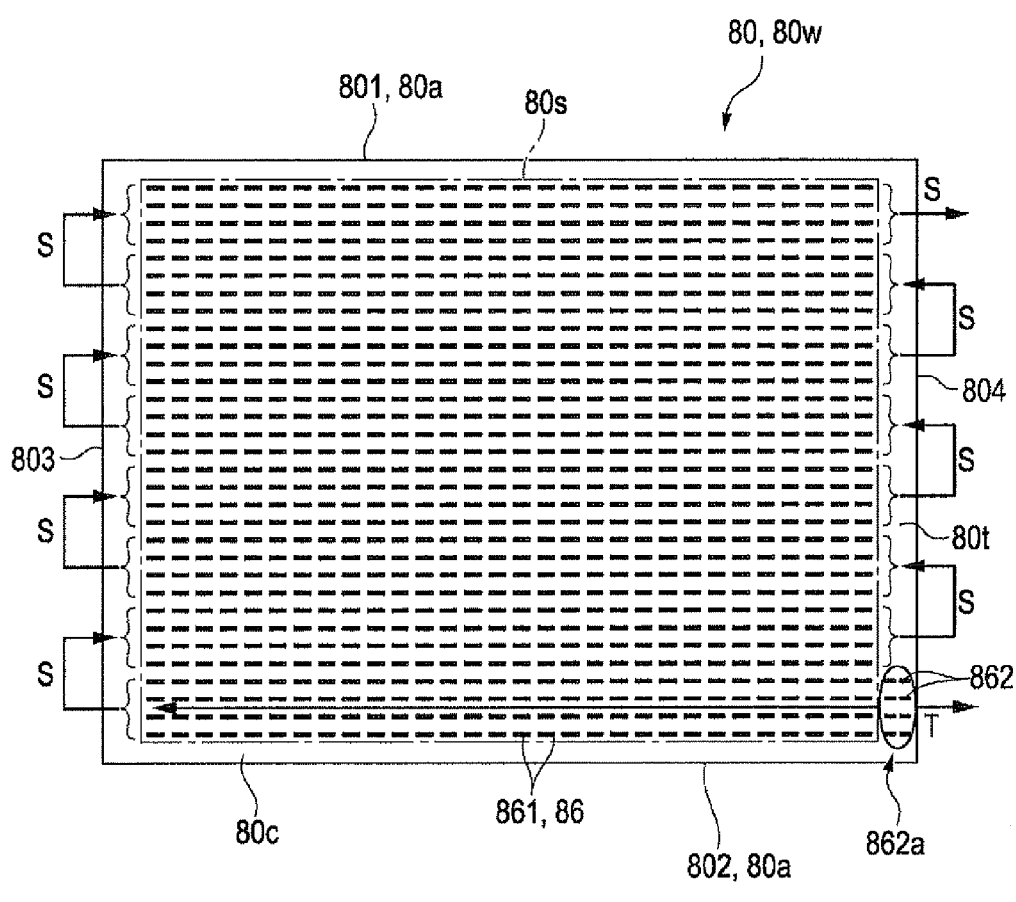
FIG. 10 is an explanatory diagram of a light guide plate used in an illuminating device of a liquid crystal display device according to a second embodiment of the invention.

FIG. 10 is an explanatory diagram of a light guide plate 80 used in an illuminating device 8 of a liquid crystal display device 100 according to a second embodiment of the invention. In addition, since the basic configuration of this embodiment is the same as that in the first embodiment, same reference numerals are given to common components, and the description thereof will be omitted.

According to this embodiment, the outer circumferential region 80t is irradiated with the laser beams La to form the second grooves 862 in the same manner as in the first embodiment. According to such a manufacturing method, a plurality of second grooves 862 is formed on each of the extended lines of the four groove arrays 86 as shown in FIG. 10 in this embodiment while one second groove 862 is formed on each of the extended lines of the groove arrays 86 in the first embodiment. According to this embodiment, an example is shown in FIG. 10 in which two second grooves 862 are formed on each of the extended lines of the groove arrays 86, and the number of the second grooves 862 is eight in total.

According to such a configuration, the number of the second grooves 862 which can be used in the inspection is larger than that in the first embodiment, and therefore, it is possible to more precisely perform the inspection.

In addition, it is possible to set more appropriate conditions for determining optical manufacturing conditions based on the inspection result of the second grooves 862 if the irradiation conditions among the manufacturing conditions (laser beams La) are changed for each of the plurality of second grooves 862 formed on each of the extended lines of the groove arrays 86.

Third Embodiment

FIG. 11 is an explanatory diagram of a light guide plate 80 used in an illuminating device 8 for a liquid crystal display device 100 according to the third embodiment of the invention. In addition, since the basic configuration of this embodiment is the same as that in the first embodiment, same reference numerals are given to common components, and the description thereof will be omitted.

According to this embodiment, the irradiation of the laser beams La is performed in the same manner as in the first embodiment to form the first grooves 861 and the second groove 862. According to such a manufacturing method, the groove array 86 is formed one by one as shown in FIG. 11 in this embodiment while the four groove arrays 86 are simultaneously formed in the first and second embodiments. Therefore, the second groove 862 is formed only on the extended line of one groove array 86 positioned on the side which is the closest to the one end side (the side which is the closest to the other side Y2 in the Y axis direction) in the Y axis direction from among the plurality of groove arrays 86.

With such a configuration, the same effects as those in the first embodiment, such as an effect that the first grooves 861 can be formed after the adjustment of the irradiation conditions of the laser beams La based on the inspection result of the second grooves 862 and the like, can be achieved. In addition, this embodiment is employed when a method is employed in which a mirror is arranged in the course of optical paths of the laser beams La and the radiation positions of the laser beams La are displaced by switching the direction of the mirror.

Other Embodiments

Although a configuration in which the one surface 881 of each light source substrate 88 faces each light incident portion 80a of the light guide plate 80 is employed in the above first to third embodiments, the invention may be applied to the liquid crystal display device 100 with a configuration in which the one surface 881 of each light source substrate 88 perpendicularly intersects with each light incident portion 80a of the light guide plate 80. In addition, although both the side of the side end surface 801 of the light guide plate 80 and the side of the side end surface 802 of the light guide plate 80 are used as the light incident portions 80a in the above first to third embodiments, the invention may be applied to the liquid crystal display device 100 with a configuration in which only one of the side end surfaces 801 and 802 is used as the light incident portion 80a.

Moreover, according to the above first to third embodiments, four groove arrays 86 aligned in the Y axis direction at equal intervals are simultaneously formed by displacing the resin plate 80w in the X axis direction and displacing the irradiation positions of the laser beams La in the X axis direction, and after the formation of the four groove arrays 86, the resin plate 80w is displaced in the Y axis direction to newly form four groove arrays 86 at positions deviated in the one side Y1 in the Y axis direction by an amount corresponding to four arrays with respect to the four groove arrays 86 previously formed. However, it is possible to form the first grooves 861 at a predetermined density by adjusting the intervals of the four laser beams La and the displacement amount of the resin plate 80w in the Y axis direction.

Implementation Example in Electronic Device

Although the description was given of embodiments where a liquid crystal television is used as an electronic device 2000 on which the liquid crystal display device 100 is mounted, the liquid display device 100 to which the invention is applied may be used as a display of a personal computer, digital signage, or a display portion of an electronic device such as a car navigation device or a mobile information terminal.

The entire disclosure of Japanese Patent Application No.: 2011-157591, filed Jul. 19, 2011, 2011-253718, filed Nov. 21, 2011, and 2011-253719, filed Nov. 21, 2011 are expressly incorporated by reference herein.

What is claimed is:

1. A lighting device comprising:
a light guide plate having a first surface as a light emitting surface, a plurality of side surfaces and a second surface which opposed to the first surface of the light guide plate; and
a plurality of light emitting elements each of which has a light emission surface facing one of the plurality of side surfaces of the light guide plate,
wherein a scattering reflection region in which a plurality of groove arrays including a plurality of first grooves linearly extending in a first direction, the plurality of groove arrays being arranged in a parallel manner in a second direction intersecting the first direction in in-plane directions, the scattering reflection region provided on the second surface, wherein a peripheral region is provided on the second surface and between the scattering reflection region and edges of the plurality of side surfaces, the peripheral region being a non-light emitting region of the light guide plate, and wherein a second groove is disposed on one side of an extended line of one of the plurality of groove arrays positioned on one end side in the second direction among the plurality of groove arrays and disposed in the peripheral region apart from the scattering reflection region.

2. The lighting device according to claim 1,
wherein the first grooves and the second groove have longitudinal directions in the first direction.

3. The lighting device according to claim 1,
wherein a third groove is provided on an extended line of one groove array positioned on a side which is closest to the one end side in the second direction among the plurality of groove arrays and on an extended line of the second groove.

4. The lighting device according to claim 1,
wherein the one of the plurality of side surfaces is configured by a side surface positioned in the second direction in the light guide plate.

5. A liquid crystal display device comprising:
the lighting device according to claim 1; and
a liquid crystal panel which is arranged so as to be overlapped on the first surface of the light guide plate.

6. A lighting device comprising:
a light guide plate having a first surface as light emitting surface, a plurality of side surfaces and a second surface which opposed to the first surface of the light guide plate; and
a plurality of light emitting elements each of which has a light emission surface facing one of the plurality of side surface of the light guide plate,
wherein a scattering reflection region in which a plurality of groove arrays including a plurality of first grooves linearly extending in a first direction, the plurality of groove arrays being arranged in a parallel manner in a second direction intersecting the first direction in in-plane directions, the scattering reflection region provided on the second surface,
wherein a peripheral region is provided on the second surface and between the scattering reflection region and edge of the plurality of side surfaces, the peripheral region being a non-light emitting region of the light guide plate, and
wherein second grooves are provided on one side of extended lines of the groove arrays positioned on one end side in the second direction among the plurality of groove arrays and disposed in the peripheral region apart from the scattering reflection region.

7. The lighting device according to claim 6,
wherein the first grooves and the second grooves have longitudinal directions in the first direction.

8. The lighting device according to claim 6,
wherein the third grooves are provided on an extended lines of one groove arrays positioned on a side which is closest to the one end side in the second direction among the plurality of groove arrays and on an extended line of the second grooves.

9. The lighting device according to claim 6,
wherein the one of the plurality of side surfaces is configured by a side surface positioned in the second direction in the light guide plate.

10. A liquid crystal display device comprising:
the lighting device according to claim 6; and
a liquid crystal panel which is arranged so as to be overlapped on the first surface of the light guide plate.

11. A manufacturing method of a light guide plate for an lighting device, the method comprising:
forming a second groove by irradiating laser beam on a peripheral region of a main surface of the light guide plate, the peripheral region provided between a scattering reflection region in which a plurality of groove arrays including a plurality of first grooves linearly extending in a first direction, the plurality of groove arrays arranged in a parallel manner in a second direction which intersects the first direction in in-plane directions and edges of the light guide plate, the peripheral region surrounding the scattering region on the main surface of the light guide plate;
starting formation of the first grooves which positioned on one end side in the second direction among the plurality of groove arrays by linearly displacing irradiation position of the laser beam from formation position of the second groove; and
inspecting the second groove after the forming of the second groove,
wherein the forming of the first grooves is performed after adjustment of irradiation conditions of the laser beams based on inspection results in the inspecting.

12. A manufacturing method of a light guide plate for an lighting device, the method comprising:
forming second grooves by irradiating laser beams on a peripheral region of a main surface of the light guide plate, the peripheral region provided between a scattering reflection region in which a plurality of groove arrays including a plurality of first grooves linearly extending in a first direction, the plurality of groove arrays arranged in a parallel manner in a second direction which intersects the first direction in in-plane directions and edges of the light guide plate, the peripheral region surrounding the scattering region on the main surface of the light guide plate;
starting formation of the first grooves which positioned on one end side in the second direction among the plurality of groove arrays by linearly displacing irradiation positions of the laser beams from formation position of the second grooves; and
inspecting the second grooves after the forming of the second grooves;
wherein the forming of the first grooves is performed after adjustment of irradiation conditions of the laser beams based on inspection results in the inspecting.

13. A light guide plate comprising:
a first main surface;
a second main surface; and
a first side surface,
a plurality of recesses being formed on the second main surface,
the plurality of recesses including a first recess and a plurality of second recesses,
the first recess being formed at a closest position from one side included in a plurality of sides constituting an outline of the second main surface,
the first recess being formed in a non-light emitting region of the light guide plate between one second recess of the plurality of second recesses that is formed at a first position closest to the first recess and the one side.

14. The light guide plate according to claim 13,
the second main surface not having any recess between the first recess and one of the plurality of second recesses.

15. The light guide plate according to claim 13,
further including a scattering reflection region in which a plurality of recesses arrays including the second recesses linearly disposing in a first direction are provided in a parallel manner in a second direction which intersecting the first direction in in-plane directions of the second main surface and the first recess is provided on an extended line of one of the plurality of second recess arrays positioned on a side which is closest to the one end side of the scattering reflection region.

16. A lighting device comprising:
the light guide plate according to claim 13; and
a plurality of light emitting elements each of which has a light emission surface facing the first side surface.

17. A liquid crystal display device comprising:
the lighting device according to claim 16; and
a liquid crystal panel which is arranged so as to be overlapped on the first main surface of the light guide plate.

18. An electronic device comprising:
the liquid crystal display device according to claim 17.

19. A manufacturing method of a light guide plate for an lighting device, the method comprising:
forming a second groove by irradiating laser beam on a peripheral region of a main surface of the light guide plate, the peripheral region provided between a scattering reflection region in which a plurality of groove arrays including a plurality of first grooves linearly extending in a first direction, the plurality of groove arrays arranged in a parallel manner in a second direction which intersects the first direction in in-plane directions and edges of the light guide plate, the peripheral region being a non-light emitting region of the light guide plate surrounding the scattering region on the main surface of the light guide plate; and
starting formation of the first grooves which positioned on one end side in the second direction among the plurality of groove arrays by linearly displacing irradiation position of the laser beam from formation position of the second groove.

20. A lighting device comprising:
a light guide plate having a first surface as a light emitting surface, a plurality of side surfaces and a second surface which opposed to the first surface of the light guide plate; and
a plurality of light emitting elements each of which has a light emission surface facing one of the plurality of side surfaces of the light guide plate,
wherein a scattering reflection region in which a plurality of groove arrays including a plurality of first grooves linearly extending in a first direction, the plurality of groove arrays being arranged in a parallel manner in a second direction intersecting the first direction in in-plane directions, the scattering reflection region provided on the second surface,
wherein a peripheral region is provided on the second surface and between the scattering reflection region and edges of the plurality of side surfaces, and
wherein a second groove is disposed on one side of an extended line of one of the plurality of groove arrays positioned on one end side in the second direction among the plurality of groove arrays and disposed apart from the scattering reflection region, and no grooves are arranged in the peripheral region other than the second groove.

21. A lighting device comprising:
a light guide plate having a first surface as light emitting surface, a plurality of side surfaces and a second surface which opposed to the first surface of the light guide plate; and
a plurality of light emitting elements each of which has a light emission surface facing one of the plurality of side surface of the light guide plate,
wherein a scattering reflection region in which a plurality of groove arrays including a plurality of first grooves linearly extending in a first direction, the plurality of groove arrays being arranged in a parallel manner in a second direction intersecting the first direction in in-plane directions, the scattering reflection region provided on the second surface,
wherein a peripheral region is provided on the second surface and between the scattering reflection region and edge of the plurality of side surface, and
wherein second grooves are provided on one side of extended lines of the groove arrays positioned on one end side in the second direction among the plurality of groove arrays and disposed in the peripheral region apart from the scattering reflection region, and no grooves are arranged in the peripheral region other than the second groove.

* * * * *